United States Patent
Hsu et al.

(10) Patent No.: US 7,596,661 B2
(45) Date of Patent: Sep. 29, 2009

(54) PROCESSING MODULES WITH MULTILEVEL CACHE ARCHITECTURE

(75) Inventors: Ting-Cheng Hsu, Hsin-Chu (TW); Yen-Yu Lin, Hsin-Chu Hsien (TW); Chih-Wei Ko, Taipei (TW); Chang-Fu Lin, Hsin-Chu (TW)

(73) Assignee: MediaTek Inc., Hsin-Chu Hsien (TW)

( * ) Notice: Subject to any disclaimer, the term of this patent is extended or adjusted under 35 U.S.C. 154(b) by 215 days.

(21) Appl. No.: 11/307,073

(22) Filed: Jan. 23, 2006

(65) Prior Publication Data

US 2007/0050553 A1    Mar. 1, 2007

Related U.S. Application Data

(60) Provisional application No. 60/596,136, filed on Sep. 1, 2005.

(51) Int. Cl.
   *G06F 13/00* (2006.01)
(52) U.S. Cl. ...................................... 711/122
(58) Field of Classification Search .................. 711/122
   See application file for complete search history.

(56) References Cited

U.S. PATENT DOCUMENTS

| | | | |
|---|---|---|---|
| 5,572,704 A | 11/1996 | Bratt | |
| 5,632,025 A | 5/1997 | Bratt | |
| 5,787,478 A | 7/1998 | Hicks | |
| 5,831,557 A * | 11/1998 | Handley | ............... 341/67 |
| 5,926,830 A | 7/1999 | Feiste | |
| 5,963,978 A | 10/1999 | Feiste | |
| 6,108,753 A | 8/2000 | Bossen | |
| 6,226,722 B1 * | 5/2001 | Shippy et al. | ............... 711/168 |
| 6,247,084 B1 | 6/2001 | Apostol, Jr. et al. | |
| 6,460,115 B1 * | 10/2002 | Kahle et al. | ............... 711/122 |
| 6,484,237 B1 | 11/2002 | Agarwala et al. | |
| 6,560,676 B1 | 5/2003 | Nishimoto et al. | |
| 7,290,107 B2 * | 10/2007 | Day et al. | ............... 711/163 |
| 2002/0007440 A1 | 1/2002 | Hosoya | |
| 2005/0047510 A1 | 3/2005 | Yamaguchi | |

FOREIGN PATENT DOCUMENTS

| CN | 1195817 A | 10/1998 |
|---|---|---|
| CN | 1054223 C | 7/2000 |

* cited by examiner

*Primary Examiner*—Matt Kim
*Assistant Examiner*—Mardochee Chery
(74) *Attorney, Agent, or Firm*—Winston Hsu

(57) ABSTRACT

A processing module with multilevel cache architecture, including: a processor; a level-one (L1) cache, coupled to the processor, for caching data for the processor, wherein the L1 cache has at least one L1 cacheable range; a level-two (L2) cache, coupled to the L1 cache, for caching data for the processor, wherein the L2 cache has at least one L2 cacheable range, and the L1 cacheable range and the L2 cacheable range are mutually exclusive; and a memory interface, coupled to the L1 cache and the L2 cache, for transferring data between the L1 cache and a memory and for transferring data between the L2 cache and the memory.

18 Claims, 9 Drawing Sheets

| Base address | C | Size | EN |

PROCESSING MODULES WITH MULTILEVEL CACHE ARCHITECTURE

CROSS REFERENCE TO RELATED APPLICATIONS

The application claims the benefit of U.S. Provisional Application No. 60/596,136, which was filed on Sep. 1, 2005 and was entitled "On-chip Multilevel Cache Architecture".

BACKGROUND

The present invention relates to system-on-chip (SoC) applications, and more particularly, to processing modules with multilevel cache architecture.

To effectively utilize an on-chip memory and to minimize the performance gap between a high-speed processor and a low-speed off-chip memory, many embedded systems exploit cache resources. There may be several levels of caches in the embedded system, for example, a level-one (L1) cache, a level-two (L2) cache, and even a level-three (L3) cache. The L1 cache is typically closest to the processor for easy access, and often has the same operating speed as that of a processing core circuit of the processor. Due to the cost of such as a high-speed on-chip memory, the size of the L1 cache is very limited, usually ranging from several kilobytes (KBs) to tens of KBs.

Taking an embedded system having two-level cache architecture as an example, when a cache miss of an L1 cache within the embedded system occurs (e.g. when a request from a processor of the system corresponds to a L1 cacheable range, and the requested data corresponding to the request is not in the L1 cache), the L1 cache will ask a L2 cache within the embedded system for the requested data. If the requested data is in the L2 cache, the requested data is sent back to the L1 cache directly. If the requested data is not in the L2 cache, however, the L2 cache has to ask an external memory for the requested data. Based on this conventional architecture, data in the L2 cache must be a superset of that in the L1 cache. In addition, when the L1 cache miss occurs, the latency of the time to obtain the requested data is extended due to the lookup time required by the L2 cache, where the size of the L2 cache typically ranges from several tens of KBs to hundreds of KBs, and the L2 cache has to maintain the coherence of data with respect to the L1 cache. The large size and coherence problem of the L2 cache make this conventional approach costly and complex to design and verify. It is needless to say how expensive and complicated to introduce a L3 cache in an embedded system.

Within an embedded system, a hardware engine (for example, a video or audio engine) may have a private memory to achieve higher performance. However, more private memories within the embedded system, it will increase the cost and testing efforts. In order to prevent these problems, it would be helpful to replace the private memory with the resources of a L2 cache that is utilized for caching data for hardware engines within the embedded system, i.e. the L2 cache is utilized as a working buffer of the hardware engine. However, it is very complicated when the L2 cache can be accessed by DMA circuitry or some other hardware bus masters within the embedded system. Since there will be more than one master accessing the L2 cache, making the cache access more random, it will reduce the effectiveness of the L2 cache by generating more cache misses or by replacing one master's data with another master's data.

SUMMARY

It is an objective of the claimed invention to provide processing modules with multilevel cache architecture.

An exemplary embodiment of a processing module with multilevel cache architecture comprises: a processor; a level-one (L1) cache, coupled to the processor, for caching data for the processor, wherein the L1 cache has at least one L1 cacheable range; a level-two (L2) cache, coupled to the L1 cache and hardware engines, for caching data for the processor and hardware engines, wherein the L2 cache has at least one L2 cacheable range, and the L1 cacheable range and the L2 cacheable range are mutually exclusive; and a memory interface, coupled to the L1 cache and the L2 cache, for transferring data between the L1 cache and a memory and for transferring data between the L2 cache and the memory.

These and other objectives of the claimed invention will no doubt become obvious to those of ordinary skill in the art after reading the following detailed description of the preferred embodiment that is illustrated in the various figures and drawings.

BRIEF DESCRIPTION OF THE DRAWINGS

FIG. 8 illustrates a plurality of control registers in the L1 cache shown in FIG. 1.

DETAILED DESCRIPTION

Figure 1:
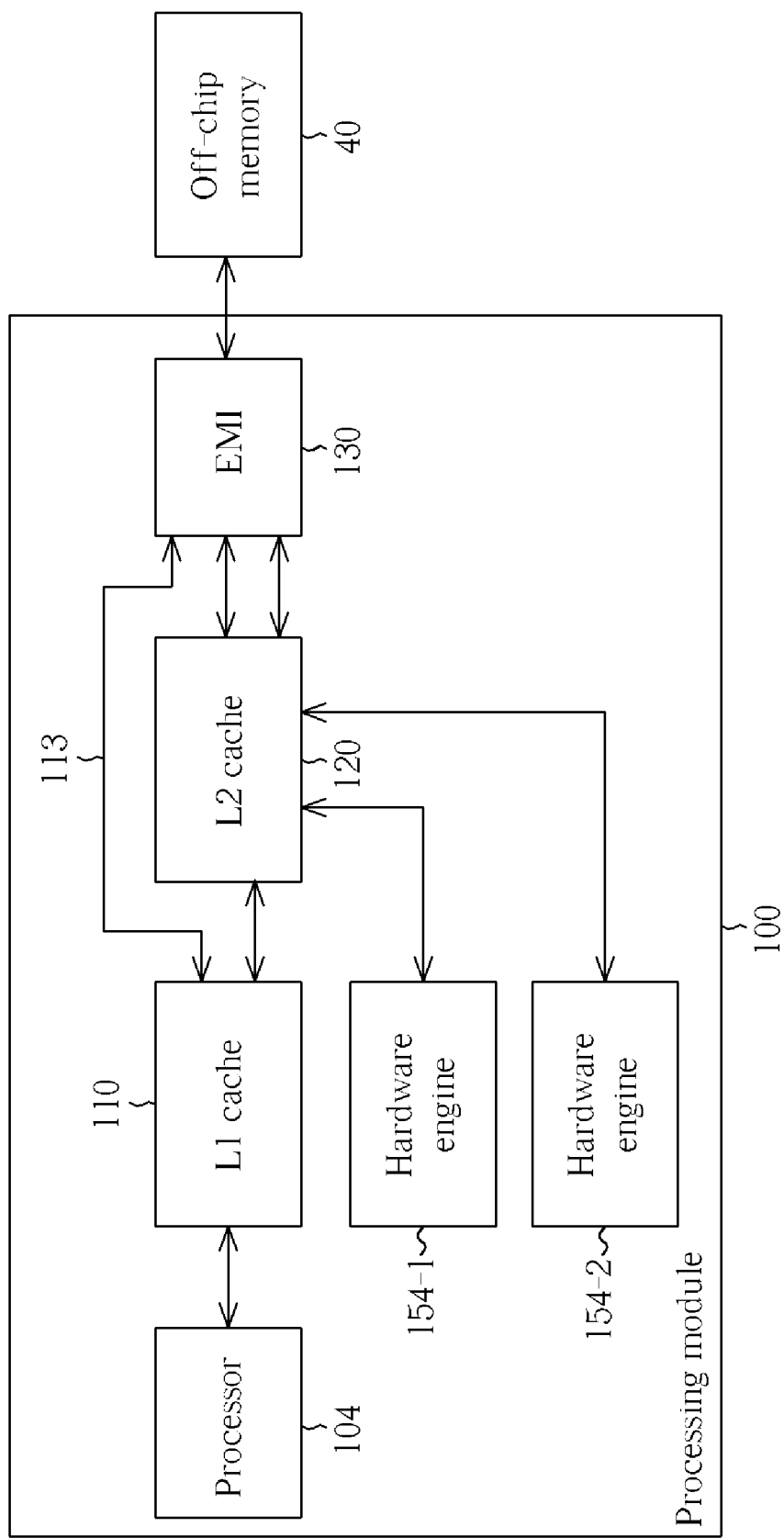
FIG. 1 is a diagram of a processing module with multilevel cache architecture according to one embodiment of the present invention.

Please refer to FIG. 1, which illustrates a processing module 100 with multilevel cache architecture according to one embodiment of the present invention, where the processing module 100 is applicable to an electronic device. The processing module 100 comprises a processor 104, a level-one (L1) cache 110, a level-two (L2) cache 120, a memory interface, such as an external memory interface (EMI), 130, and two hardware engines 154-1 and 154-2. The processor 104 can be utilized for controlling the operation of the electronic device by executing a program code, and the L1 cache 110 and the L2 cache 120 are utilized for caching data for the processor 104. The L1 cache has at least one L1 cacheable range, and more particularly, a plurality of L1 cacheable ranges. Similarly, the L2 cache has at least one L2 cacheable range, and more particularly, a plurality of L2 cacheable ranges. According to the present invention, an L1 cacheable range and an L2 cacheable range are mutually exclusive.

The memory interface mentioned above is utilized for transferring data between the L1 cache 110 and a memory and for transferring data between the L2 cache 120 and the memory. In this embodiment, the processing module 100 is a chip, and the memory is an off-chip memory 40 outside the processing module 100. The memory interface (i.e., the EMI 130 in this embodiment) is utilized for transferring data between the L1 cache 110 and the off-chip memory 40, and for transferring data between the L2 cache 120 and the off-chip memory 40. In another embodiment of the present invention, the processing module is also a chip, where the memory can be positioned within the processing module. In addition, according to the embodiment shown in FIG. 1, the hardware engines 154-1 and 154-2 are utilized for performing predetermined processing by accessing data in the L2 cache. For example, the hardware engine 154-1 is an MPEG encoder for performing MPEG encoding, and the hardware engine 154-2 is an MPEG decoder for performing MPEG decoding.

According to the present invention, the bus protocol utilized between the L1 cache 110 and the L2 cache 120 can be a single transfer bus protocol, and the bus protocol utilized either between the L1 cache 110 and the EMI 130 or between the L2 cache 120 and the EMI 130 can be a burst transfer bus protocol. Additionally, the bus protocol utilized either between the hardware engine 154-1 and the L2 cache 120 or between the hardware engine 154-2 and the L2 cache 120 can be the single transfer bus protocol or the burst transfer bus protocol, depending on different implementation choices of the present invention.

In this embodiment, the processor 104 may issue memory requests (for retrieving data) to the L1 cache 110. When the processor 104 sends a request to the L1 cache 110 to retrieve data at an address falling within one of the L1 cacheable ranges, if the requested data is in the L1 cache 110 (i.e. a cache hit of the L1 cache 110 occurs), the L1 cache 110 sends the requested data to the processor 104. Conversely, if the requested data is not in the L1 cache 110 (i.e. a cache miss of the L1 cache 110 occurs), the L1 cache 110 asks the off-chip memory 40 for the requested data (by forwarding the request to the EMI 130 through the burst transfer bus protocol mentioned above) instead of asking the L2 cache 120. After retrieving the requested data from the off-chip memory 40, the EMI 130 sends the requested data to the L1 cache 110. The L1 cache 110 then sends the requested data to the processor 104 and further saves the requested data in a cache memory (not shown) within the L1 cache 110.

On the other hand, when the processor 104 sends a request to the L1 cache 110 to retrieve data at an address falling outside one of the L1 cacheable ranges, the L1 cache 110 asks the L2 cache 1 20 for the requested data, by sending the request to the L2 cache 120 through the single bus transfer protocol mentioned above. If the requested data is in the L2 cache 120 (i.e. a cache hit of the L2 cache 120 occurs), the L2 cache 120 sends the requested data to the L1 cache 110, and the L1 cache 110 forwards the requested data from the L2 cache 120 to the processor 104 without saving the requested data. Conversely, if the requested data is not in the L2 cache 120 (i.e. a cache miss of the L2 cache 120 occurs), the L2 cache 120 asks the EMI 130 (by forwarding the request to the EMI 130 through the burst transfer bus protocol mentioned above) to transfer the requested data from the off-chip memory 40. When the requested data is transferred from the off-chip memory 40 to the L2 cache 120 by the EMI 130, the L2 cache 120 forwards the requested data to the L1 cache 110 and further saves the requested data in a cache memory (not shown) within the L2 cache 120. When the L2 cache 120 forwards the requested data to the L1 cache 110, the L1 cache 110 forwards the requested data from the L2 cache 120 to the processor 104 without saving the requested data.

In this embodiment, the hardware engines 154-1 and 154-2 may issue memory requests (for retrieving data) to the L2 cache 120. When one of the hardware engines, for example, the hardware engine 154-1, sends a request to the L2 cache 120 to retrieve data at an address falling within one of the L2 cacheable ranges, if the requested data is in the L2 cache 120 (i.e. a cache hit of the L2 cache 120 occurs), the L2 cache 120 will directly send the requested data to the hardware engine 154-1. Conversely, if the requested data is not in the L2 cache 120 (i.e. a cache miss of the L2 cache 120 occurs), the L2 cache 120 will ask the off-chip memory 40 for the requested data (by forwarding the request to the EMI 130 through the burst transfer bus protocol mentioned above). After retrieving the requested data from the off-chip memory 40, the EMI 130 sends the requested data to the L2 cache 120. Then the L2 cache 120 sends the requested data to the hardware engine 154-1 and further saves the requested data in the cache memory within the L2 cache 120.

Figure 2:
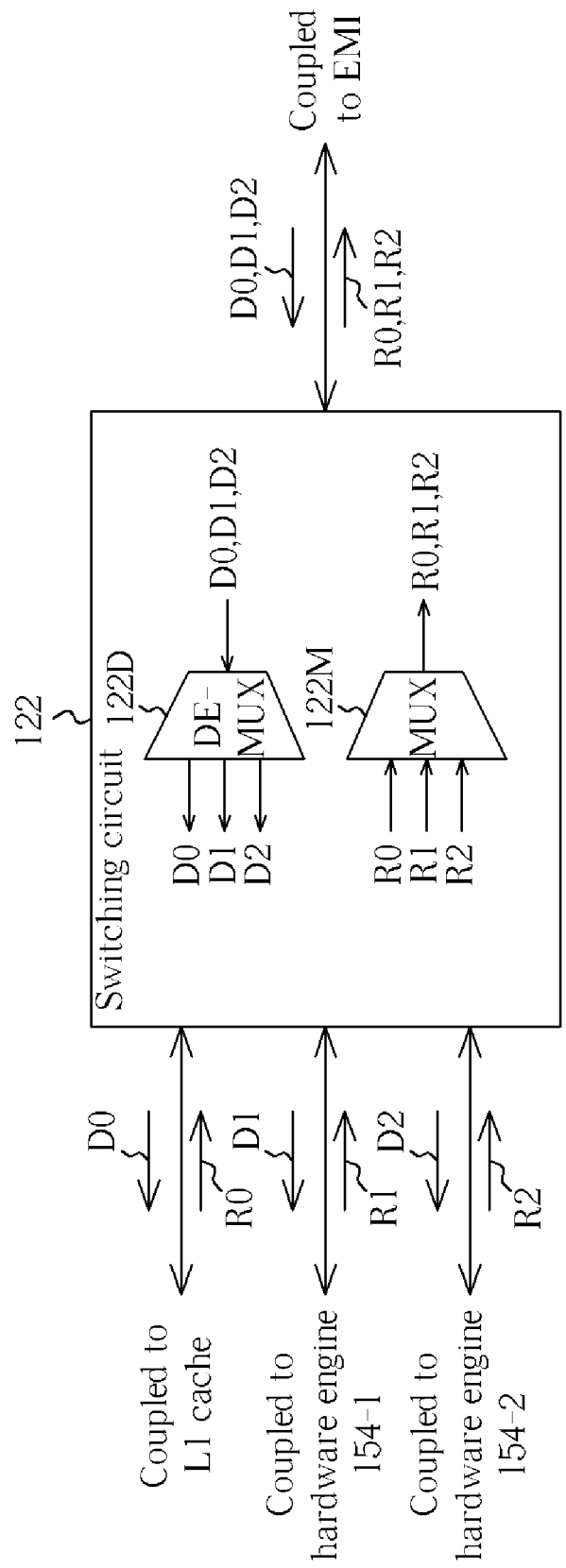
FIG. 2 is a diagram of a switching circuit within the level-two (L2) cache shown in FIG. 1.

FIG. 2 illustrates a switching circuit 122 within the L2 cache 120 shown in FIG. 1. As shown in FIG. 2, the switching circuit 122 comprises a multiplexer 122M and a demultiplexer 122D. By utilizing the multiplexer 122M, the switching circuit 122 is capable of switching between forwarding a request R0 from the processor 104 to the EMI 130 (through the L1 cache 110) and forwarding another request R1/R2 from the hardware engine 154-1/154-2 to the EMI 130. If two or more of the requests R0, R1, and R2 are received by the switching circuit 122 at the same time, the switching circuit 122 further arbitrates which request (R0, R1, or R2) should be considered first. Accordingly, by utilizing the demultiplexer 122D, the switching circuit 122 is capable of switching between forwarding data D0 corresponding to the first request R1 to the processor 104 (through the L1 cache 110) and forwarding data D1/D2 corresponding to the request R1/R2 to the corresponding hardware engine 154-1/154-2 that issues the request R1/R2.

Figure 3:
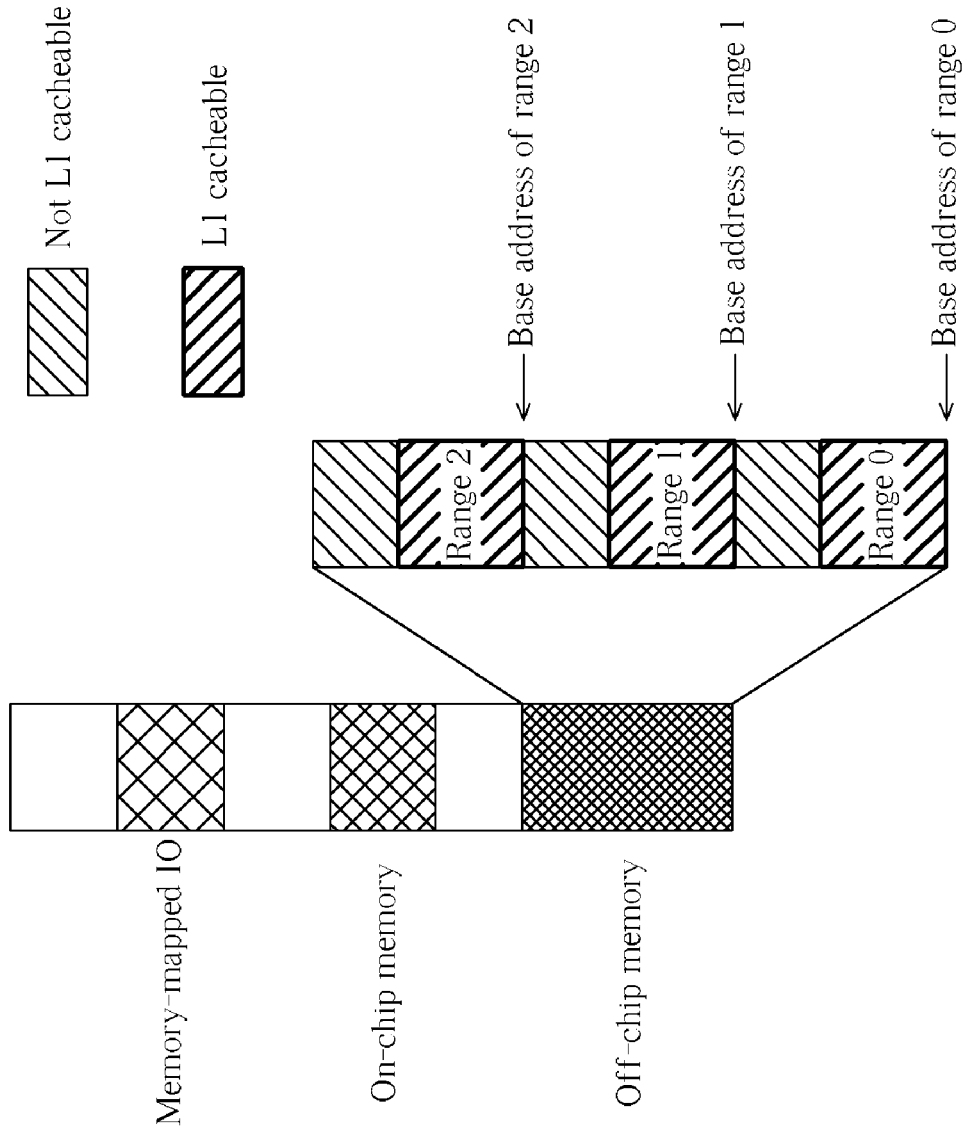
FIG. 3 is a diagram of a processor memory space and the corresponding cacheable setting applicable to the processing module shown in FIG. 1 according to one embodiment of the present invention.

FIG. 3 is a diagram of a processor memory space and the corresponding cacheable setting applicable to the processing module 100 shown in FIG.1 according to one embodiment of the present invention. As shown in FIG. 3, the processor memory space includes at least three portions: off-chip memory, on-chip memory, and memory-mapped 10. According to this embodiment, the portion of off-chip memory is cacheable for the L1 cache 110 and the L2 cache 120. If one region corresponding to a request falls within an L1 cacheable range, a controller (not shown) in the L1 cache 110 forwards the request to the EMI 130 through the direct connection 113 by utilizing the burst transfer bus protocol mentioned above, and the requested data is saved in the L1 cache 110, instead of the L2 cache 120. Conversely, if one region corresponding to a request does not fall within any L1 cacheable range, the request is sent to the L2 cache 120 by utilizing the single transfer bus protocol mentioned above. When the requested data is returned from the EMI130, the L2 cache 120 saves the requested data and further sends it to the L1 cache 110, and the requested data from the L2 cache 120 is bypassed to the processor 104 by the L1 cache 110. Therefore, the data in the L1 cache 110 and the data in the L2 cache 120 are mutually exclusive.

It should be noted that the hardware engines must not access any L1 cacheable range. For simplicity, the controller in the L1 cache 110 is not implemented with bus snooping architecture. Additionally, it is recommended that only regions storing instructions and read-only data required by the processor 104 are set as L1 cacheable ranges since, according to this invention, these regions are never supposed to be written by the hardware engines.

In a software development flow, source codes (e.g., the source of the program code mentioned above) are typically compiled to intermediate object files having some sections, for example, a CODE section for the instructions mentioned above, an R0 section for the read-only data mentioned above, an RW section (DATA) for initialized read-write data, and a Zl section for non-initialized data, where each object file has one or more sections. A linker combines sections of all object files and produces an executable file and the corresponding memory image. Most modern linkers can assign the start address of each section in the memory image. With the suggestion provided by the present invention, software developers may carefully arrange the sections to make a CODE section and an RO section of the memory image fall within the L1 cacheable ranges, and make an RW section and a Zl section of the memory image fall within the L2 cacheable ranges. When the processor 104 executes the program code, the L1 cache 110 can be utilized for caching the instructions and the read-only data of the program code, and the L2 cache 120 can be utilized for caching the initialized read-write data and the non-initialized data of the program code rather than the instructions and the read-only data.

Figure 4:
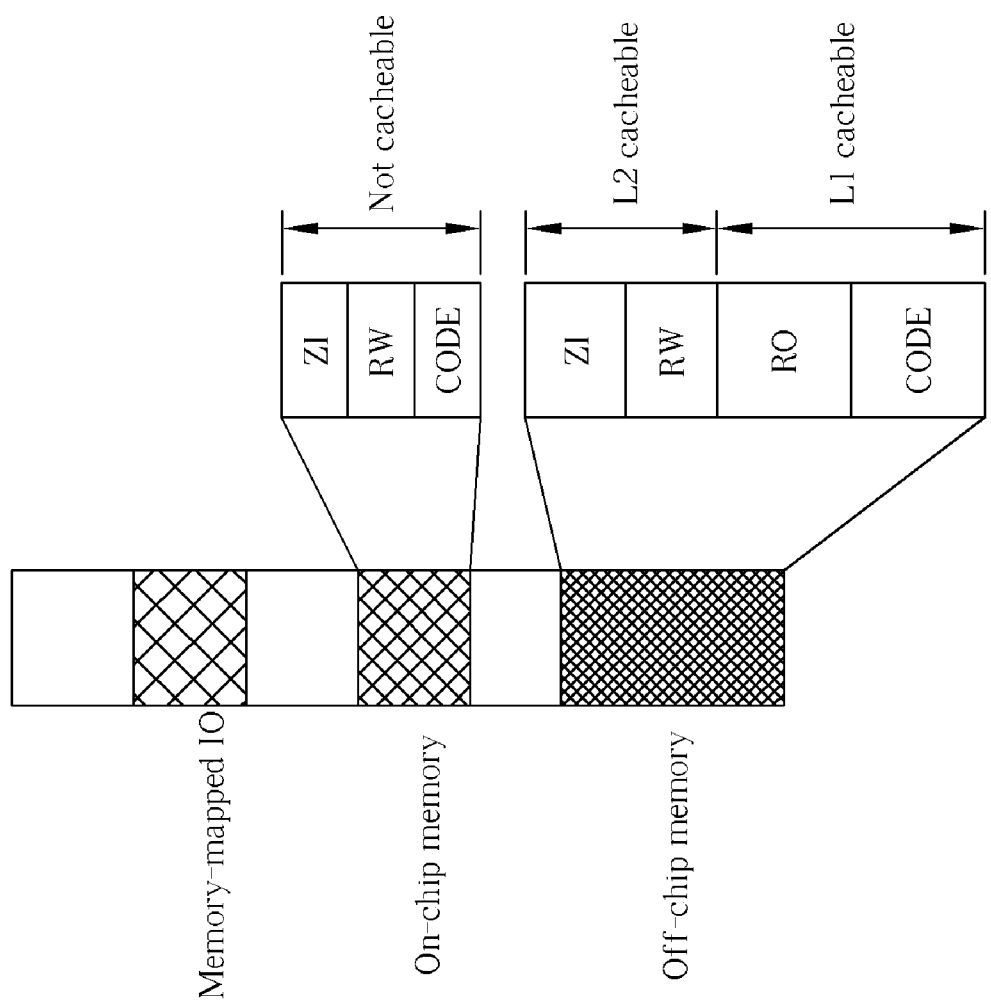
FIG. 4 is a diagram of cacheability of software sections of a program code executed by the processor shown in FIG. 1 according to one embodiment of the present invention.

Taking the arrangement shown in FIG. 4 as an example, the CODE and RO sections are positioned in a region falling within the L1 cacheable ranges mentioned above, and the DATA and Zl sections are positioned in a region falling within the L2 cacheable ranges mentioned above, and furthermore all these regions map to the off-chip memory. Additionally, there are also CODE, DATA and Rl sections mapped to the on-chip memory for fast access (e.g., for quick response requirements such as a requirement for an interrupt handler).

Figure 5:
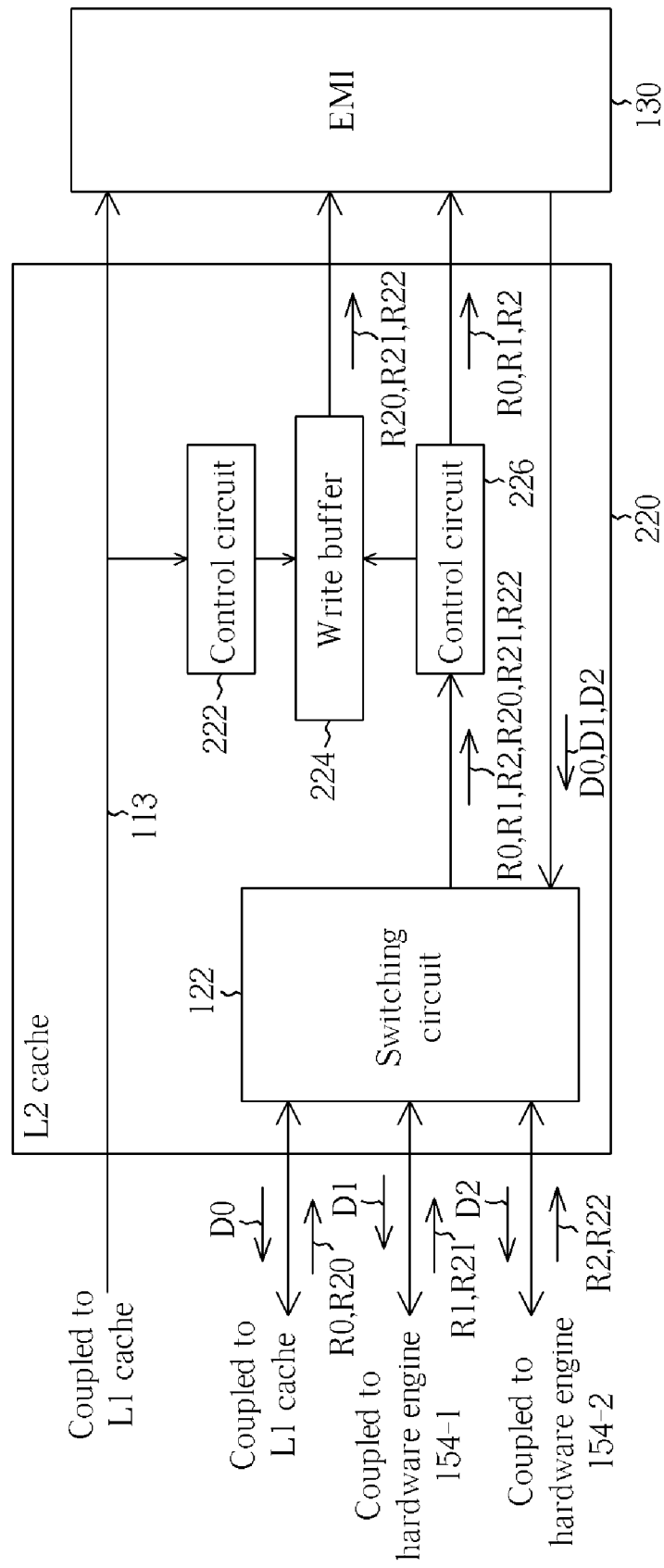
FIG. 5 is a diagram of an L2 cache applicable to the processing module shown in FIG. 1 according to one embodiment of the present invention.

Please refer to FIG. 5. FIG. 5 is a diagram of a L2 cache 220 applicable to the processing module 100 shown in FIG. 1 according to one embodiment of the present invention. The L2 cache 120 shown in FIG. 1 can be replaced by the L2 cache 220, where at least one portion of the direct connection 113 between the L1 cache 110 and the EMI1 30 is positioned in the L2 cache 220, as shown in FIG. 5. In addition to the switching circuit 122 mentioned above, the L2 cache 220 further comprises a write buffer 224 and two control circuits 222 and 226. The write buffer 224 is utilized for buffering data to be written to the off-chip memory 40 through the EMI1 30. The control circuit 222 is utilized for controlling the write buffer 224 to flush the buffered data out while receiving a request that is originally sent from the processor 104 and then forwarded by the L1 cache 110 through the direct connection 113 by utilizing the burst transfer bus protocol mentioned above.

The control circuit 226 is utilized for controlling the write buffer 224 to flush the buffered data out while receiving a request (e.g., any of the requests R0, R1, R2) of reading data at an address where the buffered data is to be written. In addition, the control circuit 226 further splits requests from the switching circuit 122 into two paths for write requests and read requests respectively. That is, the control circuit 226 controls write requests (e.g., requests R20, R21, and R22) to be sent to the EMI 130 through the write buffer 224, and controls read requests (e.g., the requests R0, R1, and R2) to be bypassed to the EMI 130. According to the architecture shown in FIG. 5, when the processor 104 executes the program code mentioned above, the L1 cache 110 can be utilized for caching not only the instructions and the read-only data but also the initialized read-write data and the non-initialized data of the program code.

Utilizing the L1 cache 110 to cache the initialized read-write data and the non-initialized data mentioned above means it is possible that the processor 104 sends a write request corresponding to the initialized read-write data or the non-initialized data if needed. In general, while sending a read request, the processor 104, the hardware engine 154-1, or the hardware engine 154-2 must wait for the requested data's return to continue operations, which means the latency of waiting for the requested data's return will affect the system performance thereof. Therefore, in most cases, read requests are typically serviced first by the EMI 130 while write requests can be serviced later when there is no read request, in order to achieve the best performance. In this situation, if the processor 104 first sends a write request (e.g., the request R20) of address A falling within an L1 cacheable range with the data to be written buffered in the write buffer 224, and later sends a read request of the same address A, and if the requested data corresponding to the read request is not in the L1 cache 110 yet, the control circuit 222 controls the write buffer 224 to flush the buffered data out while detecting the read request forwarded by the L1 cache 110 to the EMI 130 through the direct connection 113. This is in order to prevent the processor 104 from reading erroneous data at address A that has not been updated (or replaced) by the data buffered in the write buffer 224.

In another example, the hardware engine 154-1 first sends a write request (e.g., the request R21) of address B falling within an L2 cacheable range with the data to be written being buffered in the write buffer 224, and later the processor 104 sends a read request (e.g. the request R0) of the same address B, where if the requested data corresponding to the read request is not in the L2 cache 120 yet, the control circuit 226 controls the write buffer 224 to flush the buffered data out while detecting the read request. This is in order to prevent the processor 104 from reading erroneous data at address B that has not been updated (or replaced) by the data buffered in the write buffer 224.

In a variation of this embodiment, the control circuit 222 controls the write buffer 224 to flush the buffered data out while detecting any request at the direct connection 113. In another variation of this embodiment, the control circuit 226 controls the write buffer 224 to flush the buffered data out while detecting any read request from the switching circuit 122.

Figure 6:
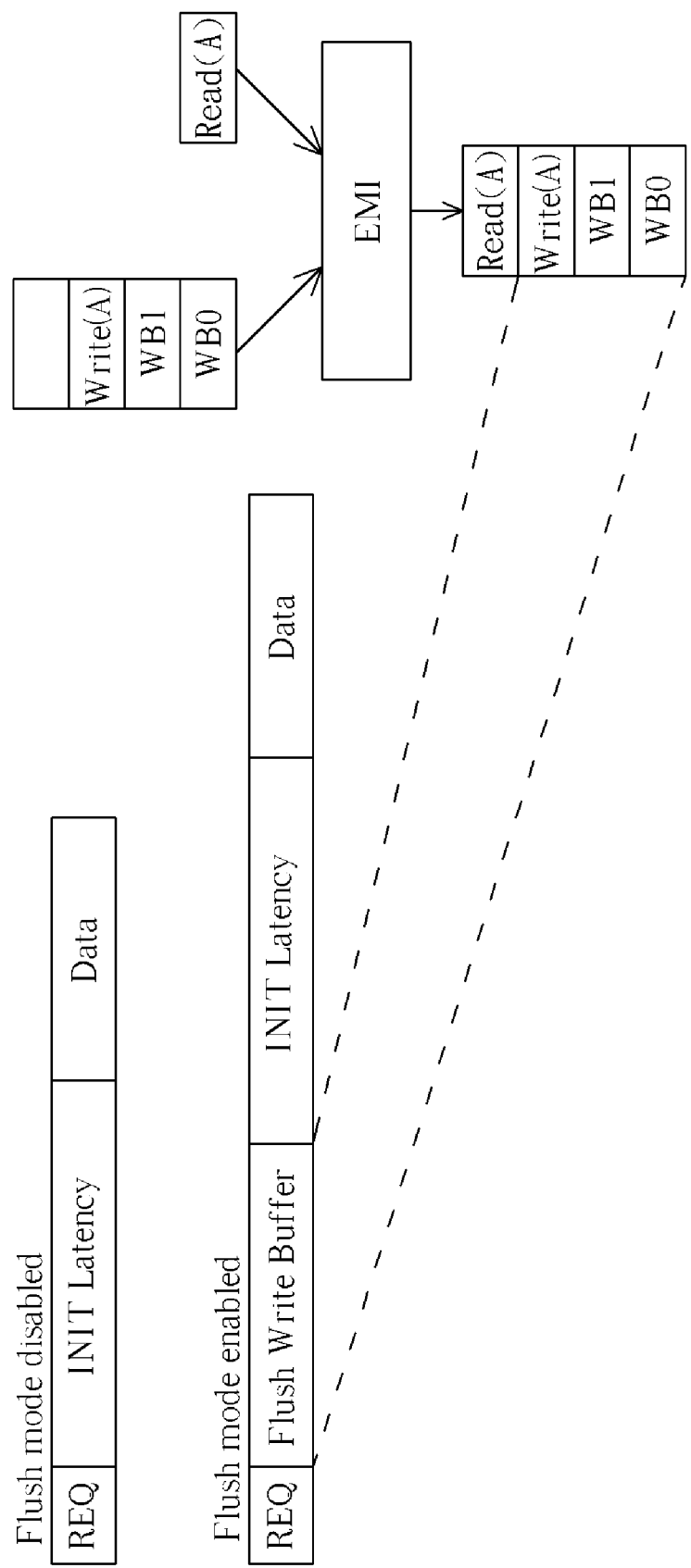
FIG. 6 is a timing diagram of flushing a write buffer according to one embodiment of the present invention.

FIG. 6 is a timing diagram of flushing a write buffer, for example the write buffer 224 shown in FIG. 5. As shown in the left portion of FIG. 6, in contrast to the situation "flush mode disabled", an additional period for flushing the write buffer is inserted between the periods "REQ" and "INIT Latency" in the situation "flush mode enabled". For example, when data WB0 and WB1 are already buffered in the write buffer 224, there is first a command Write(A) for writing the data at address A and then a command Read(A) for reading data at address A. By first flushing the data WB0 and WB1 buffered in the write buffer 224, the present invention ensures the EMI 130 first servers the request of the command Write(A) and then servers the request of the command Read(A).

Figure 7:
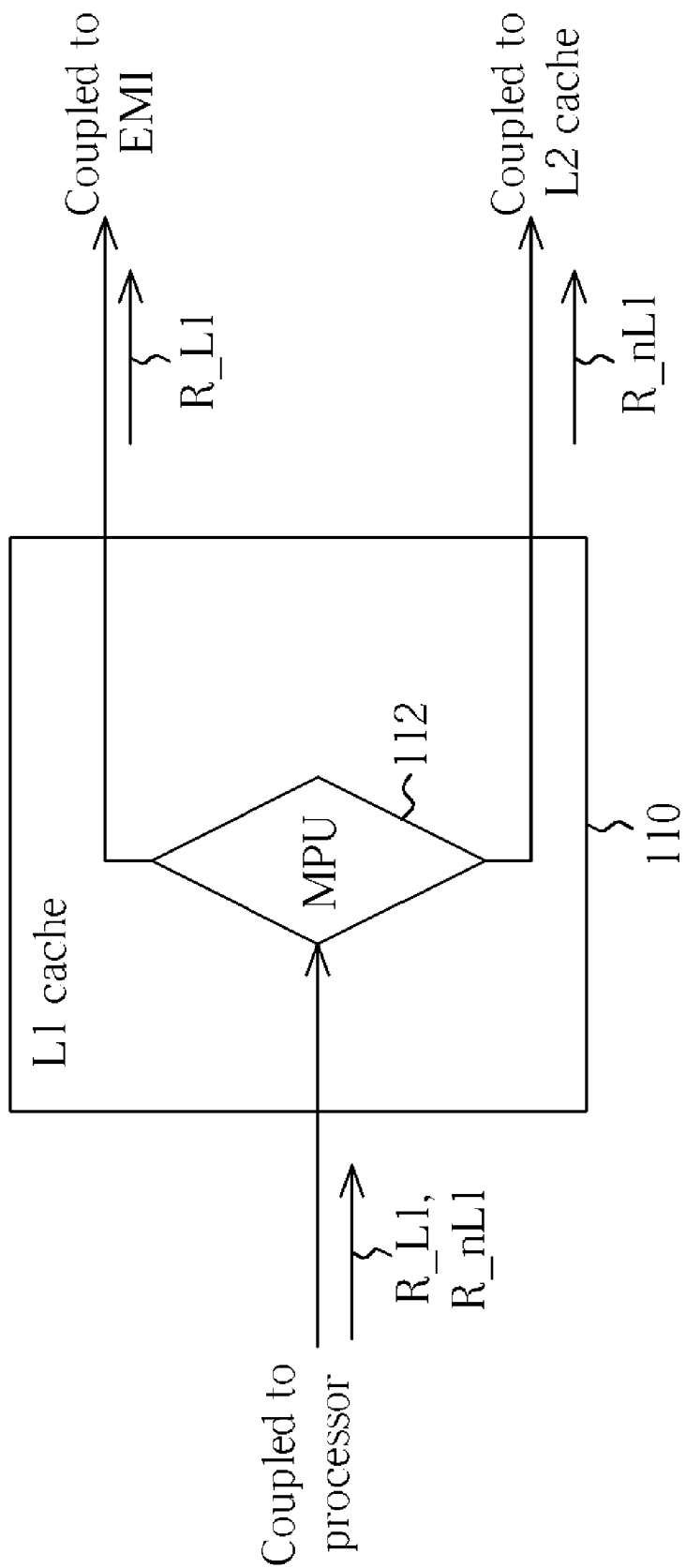
FIG. 7 illustrates a memory protection unit (MPU) in the level-one (L1) cache shown in FIG. 1.
Figure 8:
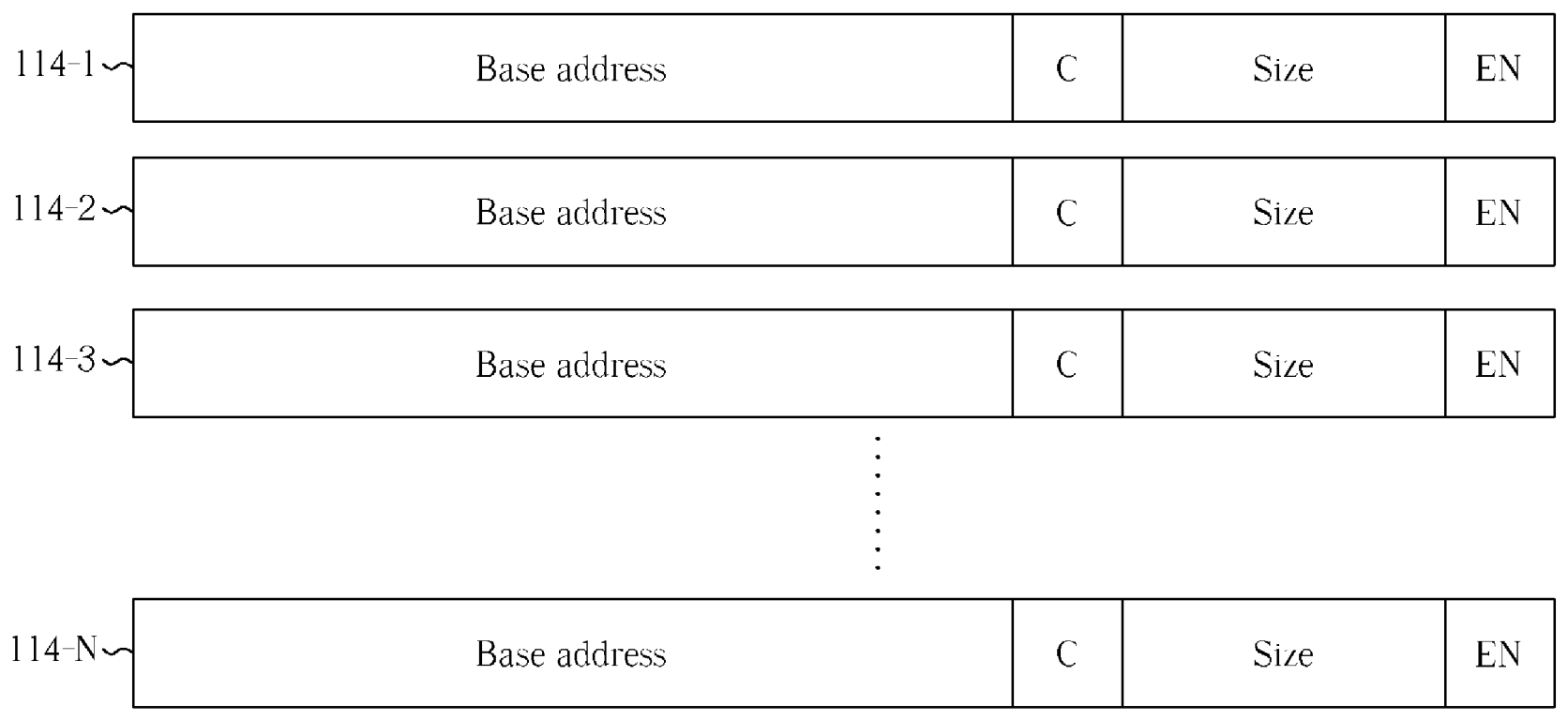
Figure 9:
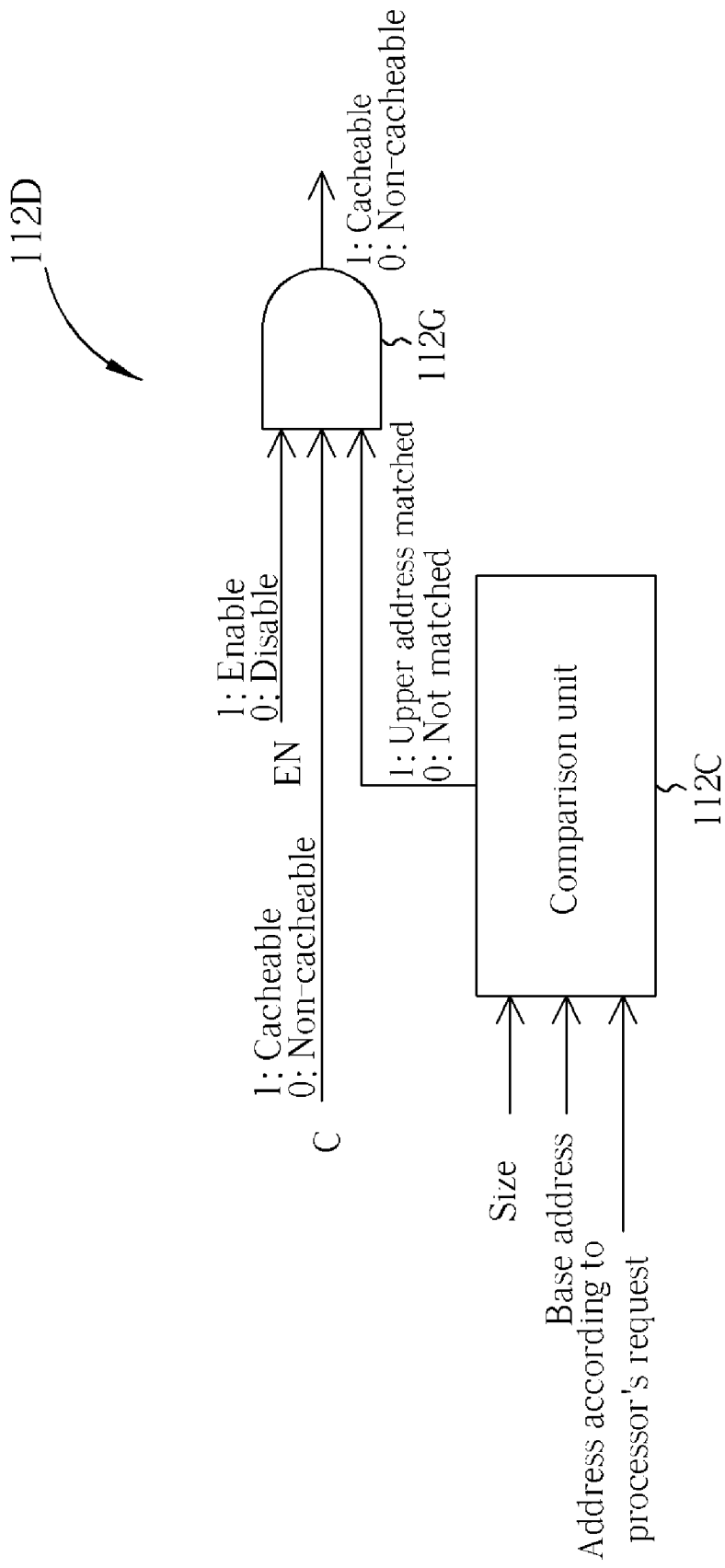
FIG. 9 illustrates a determining circuit in the MPU shown in FIG. 7.

Please refer to FIG. 7, FIG. 8, and FIG. 9. According to the embodiment shown in FIG. 1, the L1 cache 110 comprises a memory protection unit (MPU) 112 and a plurality of control registers 114-1, 114-2, 114-3, . . . , 114-N, where the MPU 112 comprises a determining module 112D comprising a comparison unit 112C and an AND logic 112G. According to different implementation choices of this embodiment, the control registers 114-1, 114-2, 114-3, . . . , 114-N can be positioned in the MPU 112 or outside the MPU 112.

The control registers 114-1, 114-2, 114-3, . . . , 114-N are utilized for storing cacheability information defining the L1 cacheable ranges mentioned above, and in particular, for respectively storing a plurality of portions of the cacheability information defining the L1 cacheable ranges. In addition, the determining module 112D, which is coupled to the control registers 114-1, 114-2, 114-3, . . . , 114-N, is utilized for determining cacheability corresponding to a request from the processor 104 according to the cacheability information. For example, if a request R_L1 from the processor 104 corresponds to an address falling within one of the L1 cacheable ranges, the MPU 112 forwards the request R_L1 to the EMI 130. Conversely, if a request R_nL1 from the processor 104 corresponds to an address falling outside the L1 cacheable ranges, the MPU 112 forwards the request R_nL1 to the L2 cache 120.

The determining module 112D determines whether a specific region is cacheable according to a specific portion of the cacheability information and the request R_L1/R_nL1 from the processor 104. As shown in FIG. 8, the format of the cacheability information in each control register comprises a plurality of fields "Base address", "C", "Size", and "EN", which respectively represent the upper bits of a region's start address, the region's cacheability attribute, the region's size, and an enabling bit of this control register. According to this embodiment, a user may specify some address upper bits in the field "Base address". The number of valid address upper bits depends on the region's size, which can be ($2^n$) bytes, such as 1 KBs, 2 KBs, 4 KBs, . . . etc. For example, if the region's size is 1 KBs, only address upper bits [31:10] are required for defining the base address. If the region's size is 2 KBs, only address upper bits [31:11] are required for defining the base address. In general, if the region's size is ($2^n$) bytes, only (32-n) address upper bits are compared with the base address setting in control registers. The relation of the base address and the region's size introduces a limitation such that the start address of any region defined as mentioned must be aligned to its region's size boundary. For example, if a region's size is 8 KBs, its base address must be a multiple of 8 KBs.

According to this embodiment, the contents in the fields "Base address", "C", "Size", and "EN" are sent to the comparison unit 112C and the AND gate 112G as shown in FIG. 9. According to the content of the field "C", the comparison unit 112C determines the number of upper bits of the start address of the specific region mentioned above (i.e. the address according to the processor's request shown in FIG. 9) that should be compared with the content of the field "Base address". While the start address of the specific region (corresponding to the processor's request) matches the content of the field "Base address" in any of the control registers, and the enabling bit thereof is set, if the value of the content in the field "C" is equal to one, then the AND logic 112G determines this access is "cacheable"; otherwise (i.e. the value of the content in the field "C" is equal to zero or the value of "EN" is zero) the AND logic 112G determines this access is non-cacheable.

According to a variation of this embodiment, the control circuit 226 simply controls flushing the write buffer 224 as mentioned, but without splitting the requests into two paths.

According to another embodiment of the present invention, another L1 cache (not shown) is coupled between the L2 cache 120 and the hardware engine 154-1, and is utilized for caching data for the hardware engine 154-1.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A processing module with multilevel cache architecture, comprising:
a processor;
a level-one (L1) cache, coupled to the processor, for caching data for the processor, wherein the L1 cache corresponds to at least one L1 cacheable range of a memory;
a level-two (L2) cache, coupled to the L1 cache, for caching data for the processor, wherein the L2 cache corresponds to at least one L2 cacheable range of the memory, and the L1 cacheable range and the L2 cacheable range are mutually exclusive; and
a memory interface, coupled to the L1 cache and the L2 cache, for transferring data between the L1 cache and the memory and for transferring data between the L2 cache and the memory,
wherein when the processor executes a program code, the L1 cache is utilized for caching instructions and read-only data of the program code, and the L2 cache is utilized for caching initialized read-write data and non-initialized data of the program code; when the processor sends a request to the L1 cache to retrieve data at an address falling within the L1 cacheable range, if the requested data is not in the L1 cache, the L1 cache asks the memory instead of the L2 cache for the requested data; and when the processor sends a request to the L1 cache to retrieve data at an address falling outside the L1 cacheable range, the L1 cache asks the L2 cache for the requested data, and if the requested data is in the L2 cache, the L1 cache forwards the requested data from the L2 cache to the processor without saving the requested data in the L1 cache;
wherein the L1 cache comprises:
at least one control register for storing cacheability information defining the L1 cacheable range; and
a determining module, coupled to the control register, for determining whether the request retrieves data at an address falling within the L1 cacheable range by inspecting the cacheability information of the control register.

2. The processing module of claim 1, further comprising:
at least one hardware engine, coupled to the L2 cache, for performing predetermined processing by accessing data in the L2 cache.

3. The processing module of claim 2, wherein the hardware engine is an MPEG encoder for performing MPEG encoding or an MPEG decoder for performing MPEG decoding.

4. The processing module of claim 2, further comprising:
another L1 cache, coupled between the L2 cache and the hardware engine, for caching data for the hardware engine.

5. The processing module of claim 2, wherein the L2 cache comprises a switching circuit for switching between forwarding a first request from the processor to the memory interface and forwarding a second request from the hardware engine to the memory interface, and switching between forwarding data corresponding to the first request to the processor and forwarding data corresponding to the second request to the hardware engine.

6. The processing module of claim 1, wherein when the processor executes a program code, the L1 cache is utilized for caching instructions, read-only data, initialized read-write data, and non-initialized data of the program code, and the L2 cache comprises:
a write buffer for buffering data to be written to the memory through the memory interface; and
a control circuit, coupled to the write buffer, for controlling the write buffer to flush the buffered data out while receiving a request.

7. The processing module of claim 1, wherein when the processor executes a program code, the L1 cache is utilized for caching instructions, read-only data, initialized read-write data, and non-initialized data of the program code, and the L2 cache comprises:
a write buffer for buffering data to be written to the memory through the memory interface; and
a control circuit, coupled to the write buffer, for controlling the write buffer to flush the buffered data out while receiving a request of reading data at an address where the buffered data is to be written.

8. The processing module of claim 1, wherein the L1 cache comprises:
at least one control register for storing cacheability information defining the L1 cacheable range; and
a determining module, coupled to the control register, for determining cacheability corresponding to a request from the processor according to the cacheability information.

9. The processing module of claim 8, wherein the L1 cache has a plurality of L1 cacheable ranges, the L1 cache comprises a plurality of control registers for respectively storing a plurality of portions of the cacheability information defining the L1 cacheable ranges, and the determining module determines whether a specific region is cacheable according to a specific portion of the cacheability information and the request.

10. The processing module of claim 1, wherein the processing module is a chip, and the memory is an off-chip memory outside the processing module.

11. The processing module of claim 1, wherein the processing module is a chip, and the memory is positioned within the processing module.

12. A processing module with multilevel cache architecture, comprising:
   a processor;
   a level-one (L1) cache, coupled to the processor, for caching data for the processor, wherein the L1 cache corresponds to at least one L1 cacheable range of a memory; and
   a level-two (L2) cache, coupled to the L1 cache, for caching data for the processor, wherein the L2 cache corresponds to at least one L2 cacheable range of the memory, and the L1 cacheable range and the L2 cacheable range are mutually exclusive,
   wherein when the processor executes a program code, the L1 cache is utilized for caching instructions and read-only data of the program code, and the L2 cache is utilized for caching initialized read-write data and non-initialized data of the program code; and when the processor sends a request to the L1 cache to retrieve data at an address falling outside the L1 cacheable range, the L1 cache asks the L2 cache for the requested data, and if the requested data is in the L2 cache, the L1 cache forwards the requested data from the L2 cache to the processor without saving the requested data in the L1 cache,
   wherein the L1 cache comprises:
   at least one control register for storing cacheability information defining the L1 cacheable range; and
   a determining module, coupled to the control register, for determining whether the request retrieves data at an address falling within the L1 cacheable range by inspecting the cacheability information of the control register.

13. The processing module of claim 12, further comprising:
   at least one hardware engine, coupled to the L2 cache, for performing predetermined processing by accessing data in the L2 cache.

14. The processing module of claim 12, wherein
   the L1 cache has a plurality of L1 cacheable ranges, the L1 cache comprises a plurality of control registers for respectively storing a plurality of portions of the cacheability information defining the L1 cacheable ranges, and the determining module determines whether a specific region is cacheable according to a specific portion of the cacheability information and the request.

15. A processing module with multilevel cache architecture, comprising:
   a processor;
   a level-one (L1) cache, coupled to the processor, for caching data for the processor, wherein the L1 cache corresponds to at least one L1 cacheable range of a memory;
   a level-two (L2) cache, coupled to the L1 cache, for caching data for the processor, wherein the L2 cache corresponds to at least one L2 cacheable range of the memory; and
   a memory interface, coupled to the L1 cache and the L2 cache, for transferring data between the L1 cache and the memory and for transferring data between the L2 cache and the memory,
   wherein when the processor executes a program code, the L1 cache is utilized for caching instructions and read-only data of the program code, and the L2 cache is utilized for caching initialized read-write data and non-initialized data of the program code; and when the processor sends a request to the L1 cache to retrieve data at an address falling outside the L1 cacheable range, the L1 cache asks the L2 cache for the requested data, if the requested data is not in the L2 cache, the L2 cache asks the memory interface to transfer the requested data from the memory, and when the requested data is transferred by the memory interface from the memory to the L2 cache and the L2 cache forwards the requested data to the L1 cache, the L1 cache forwards the requested data from the L2 cache to the processor without saving the requested data in the L1 cache,
   wherein the L1 cache comprises:
   at least one control register for storing cacheability information defining the L1 cacheable range; and
   a determining module, coupled to the control register, for determining whether the request retrieves data at an address falling within the L1 cacheable range by inspecting the cacheability information of the control register.

16. The processing module of claim 15, wherein the L1 cacheable range and the L2 cacheable range are mutually exclusive.

17. The processing module of claim 15, further comprising:
   at least one hardware engine, coupled to the L2 cache, for performing predetermined processing by accessing data in the L2 cache.

18. The processing module of claim 15, wherein the L1 cache has a plurality of L1 cacheable ranges, the L1 cache comprises a plurality of control registers for respectively storing a plurality of portions of the cacheability information defining the L1 cacheable ranges, and the determining module determines whether a specific region is cacheable according to a specific portion of the cacheability information and the request.

* * * * *